United States Patent
Ichihashi et al.

(10) Patent No.: US 11,837,961 B2
(45) Date of Patent: Dec. 5, 2023

(54) POWER CONVERSION APPARATUS

(71) Applicant: DENSO CORPORATION, Kariya (JP)

(72) Inventors: Katsuhiro Ichihashi, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 17/534,820

(22) Filed: Nov. 24, 2021

(65) Prior Publication Data
US 2022/0085720 A1   Mar. 17, 2022

Related U.S. Application Data

(63) Continuation of application No. PCT/JP2020/018381, filed on May 1, 2020.

(30) Foreign Application Priority Data
May 24, 2019   (JP) .................. 2019-097789

(51) Int. Cl.
*H02M 3/24* (2006.01)
*H02J 7/00* (2006.01)

(52) U.S. Cl.
CPC ............. *H02M 3/24* (2013.01); *H02J 7/0068* (2013.01)

(58) Field of Classification Search
CPC ............. H02M 3/24; H02J 7/0068; H02J 7/00
See application file for complete search history.

(56) References Cited

FOREIGN PATENT DOCUMENTS

JP         2004-201458 A      7/2004

*Primary Examiner* — Robert L Deberadinis
(74) *Attorney, Agent, or Firm* — Oliff PLC

(57) ABSTRACT

A power conversion apparatus (1) is used so as to be connected to three voltage units. The power conversion apparatus includes three power-conversion circuit units and a transformer (4). The three power-conversion circuit units are respectively connected to voltage units that differ from one another. Three coils (5) of the transformer (4) are connected to power-conversion circuit units that differ from one another. The three coils (5) are magnetically coupled with one another. The three coils (5) are arranged so as to be arrayed in a coil axial direction (z). One of the voltage units is a high-voltage battery. Among the coils other than a high-voltage battery-side coil (51) that is connected to the high-voltage battery, the coil (5) of which a power value that flows thereto is largest is arranged in a position that is adjacent to the high-voltage battery-side coil (51).

5 Claims, 11 Drawing Sheets

POWER CONVERSION APPARATUS

CROSS-REFERENCE TO RELATED APPLICATION

The present application is a continuation application of International Application No. PCT/JP2020/018381, filed on May 1, 2020, which claims priority to Japanese Patent Application No. 2019-097789, filed on May 24, 2019. The contents of these applications are incorporated herein by reference in their entirety.

BACKGROUND

Technical Field

The present disclosure relates to a power conversion apparatus.

Related Art

A transformer that is used in a multiple-output power supply apparatus that is connected to three voltage units is known. The transformer includes a primary coil on an input side to which power from an alternating-current power supply that serves as a voltage unit is supplied, and a secondary coil and a tertiary coil on an output side that are magnetically coupled with the primary coil. The secondary coil and the tertiary coil are respectively connected to voltage units that differ from each other.

SUMMARY

One aspect of the present disclosure provides a power conversion apparatus that is connected to three or more voltage units, in which the power conversion apparatus includes: three or more power-conversion circuit units that are respectively connected to the three or more voltage units; and a transformer that includes three or more coils that are respectively connected to the three or more power-conversion circuit units. The three or more coils are magnetically coupled with one another and arranged so as to be arrayed in a coil axial direction. At least one of the voltage units is a high-voltage battery. When the coil that is connected to the high-voltage battery is a high-voltage battery-side coil, of the coils other than the high-voltage battery-side coil, the coil of which a power value that flows thereto is largest is arranged in a position that is adjacent to the high-voltage battery-side coil.

BRIEF DESCRIPTION OF THE DRAWINGS

In the accompanying drawings.

DESCRIPTION OF THE EMBODIMENTS

Figure 1:
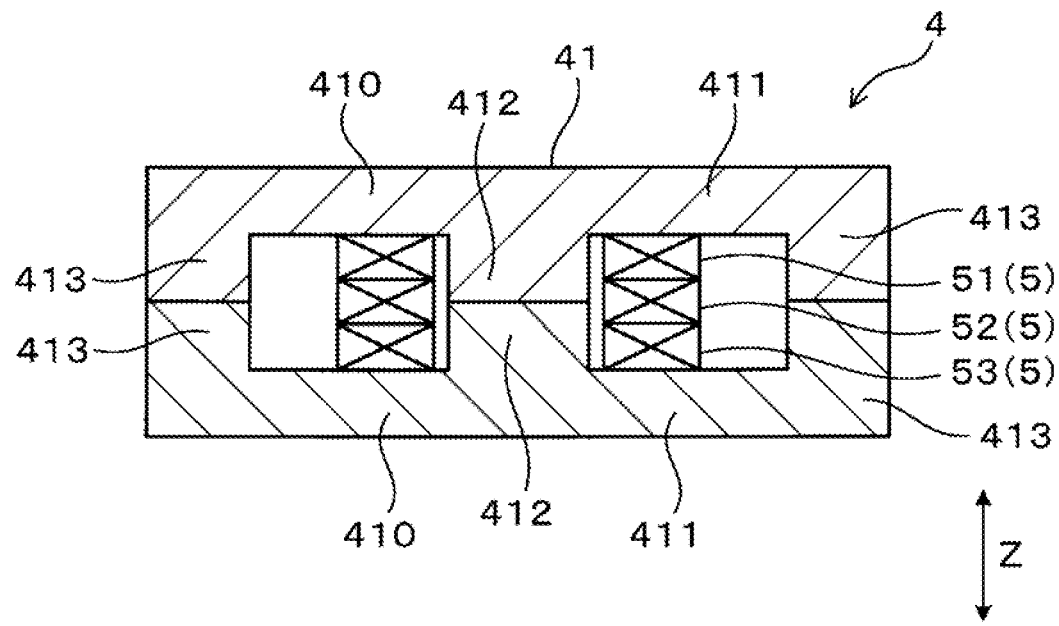
FIG. 1 is a schematic cross-sectional view of a transformer according to a first embodiment.

JP-A-2004-201458 discloses a transformer that is used in a multiple-output power supply apparatus that is connected to three voltage units. The transformer includes a primary coil on an input side to which power from an alternating-current power supply that serves as a voltage unit is supplied, and a secondary coil and a tertiary coil on an output side that are magnetically coupled with the primary coil. The secondary coil and the tertiary coil are respectively connected to voltage units that differ from each other.

In the transformer, there is room for improvement regarding efficient power transmission between the primary coil, and the secondary coil and the tertiary coil in cases in which power consumption of the voltage unit that is connected to the secondary coil and power consumption of the voltage unit that is connected to the tertiary coil differ or the like.

It is thus desired to provide a power conversion apparatus that includes a transformer that has three or more coils, in which the power conversion apparatus is capable of efficiently performing power transmission between the coils.

An exemplary embodiment of the present disclosure provides a power conversion apparatus that is connected to three or more voltage units, in which the power conversion apparatus includes: three or more power-conversion circuit units that are respectively connected to the three or more voltage units; and a transformer that includes three or more coils that are respectively connected to the three or more power-conversion circuit units. The three or more coils are magnetically coupled with one another and arranged so as to be arrayed in a coil axial direction. At least one of the voltage units is a high-voltage battery. When the coil that is connected to the high-voltage battery is a high-voltage battery-side coil, of the coils other than the high-voltage battery-side coil, the coil of which a power value that flows thereto is largest is arranged in a position that is adjacent to the high-voltage battery-side coil.

In the power conversion apparatus according to the above-described exemplary embodiment, of the coils other than the high-voltage battery-side coil, the coil of which the power value that flows thereto is the largest is arranged in a position that is adjacent to the high-voltage battery-side coil. Here, magnetic coupling with the high-voltage battery-side coil can be strengthened as the coil becomes closer to the high-voltage battery-side coil. Consequently, as a result of this arrangement being used, the coil that performs transmission of high power with the high-voltage battery-side coil can be placed closer to the high-voltage battery-side coil. Transmission of electric power can be efficiently performed.

As described above, according to the above-described exemplary embodiment, a power conversion apparatus that includes a transformer that has three or more coils in which the power conversion apparatus is capable of efficiently performing power transmission between the coils can be provided.

First Embodiment

An embodiment of a power conversion apparatus will be described with reference to FIG. 1 to FIG. 3.

Figure 2:
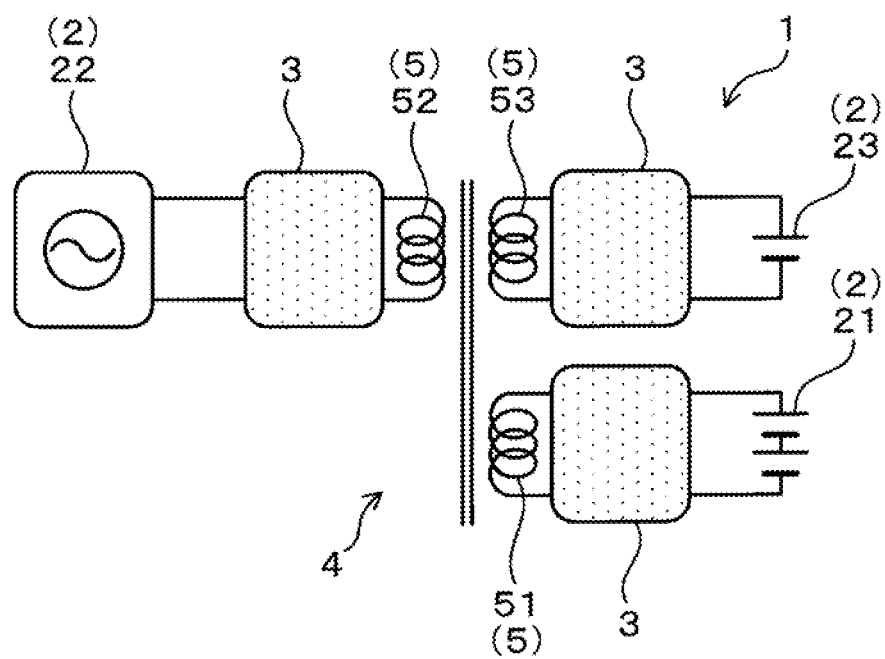
FIG. 2 is a circuit configuration diagram of a power conversion apparatus according to the first embodiment.

As shown in FIG. 2, a power conversion apparatus 1 according to the present embodiment is used so as to be connected to three voltage units 2 that are a high-voltage battery 21, an alternating-current power supply 22, and a 12 V power storage apparatus 23 that serves as a power storage apparatus.

The power conversion apparatus 1 includes three power-conversion circuit units 3 and a transformer 4. The three power-conversion circuit units 3 are respectively connected to voltage units 2 that differ from one another. The transformer 4 includes three coils 5. The three coils 5 are respectively connected to power-conversion circuit units 3 that differ from one another. The three coils 5 are a high-voltage battery-side coil 51, an alternating-current power supply-side coil 52, and a 12 V power storage apparatus-side coil 53.

The high-voltage battery-side coil 51 is the coil 5 that is electrically connected to the high-voltage battery 21 with the power-conversion circuit unit 3 therebetween. The alternating-current power supply-side coil 52 is the coil 5 that is electrically connected to the alternating-current power supply 22 with the power-conversion circuit unit 3 therebetween. The 12 V power storage apparatus-side coil 53 is the coil 5 that is electrically connected to the 12 V power storage apparatus 23 with the power-conversion circuit unit 3 therebetween.

The three coils 5 are magnetically coupled with one another. As shown in FIG. 1, the three coils 5 are arranged so as to be arrayed in a coil axial direction Z. Of the coils other than the high-voltage battery-side coil 51, the coil 5 of which a power value that flows thereto is largest is the alternating-current power supply-side coil 52. In addition, the alternating-current power supply-side coil 52 is arranged in a position that is adjacent to the high-voltage battery-side coil 51.

The present embodiment will be described hereafter.

The power conversion apparatus 1 is mounted in a vehicle such as an electric car or a hybrid car. As shown in FIG. 2, according to the present embodiment, the three voltage units 2 that are electrically connected to the power conversion apparatus 1 are the high-voltage battery 21, the alternating-current power supply 22, and the 12 V power storage apparatus.

The high-voltage battery 21 is mounted in a vehicle such as an electric car or a hybrid car, and is a battery for vehicle driving that is capable of storing therein electric power for driving the vehicle and outputting electric power. For example, the high-voltage battery 21 may be a battery that has a rated voltage of 200 V or higher.

The alternating-current power supply 22 is a type of power supply unit for supplying power to the high-voltage battery 21 from outside the vehicle. That is, for example, an alternating-current charger such as a power supply station may be assumed as the alternating-current power supply 22.

In addition, although not shown, the alternating-current power supply 22 can be that to which an alternating-current output port is connected in parallel. For example, the alternating-current power supply 22 and the alternating-current output port may be configured to be capable of inputting and outputting alternating-current power of an effective voltage of 100 V. In addition, a relay that is capable of switching between energization and cut-off can be provided in the alternating-current output port. Hereafter, the alternating-current power supply 22 refers to a configuration that also includes the alternating-current output port, unless otherwise stated.

The power storage apparatus can have a rated voltage of 60 V or lower (such as 12 V or 48 V). In addition, the 12 V power storage apparatus 23 that serves as the power storage apparatus can be a battery for auxiliary apparatuses that are mounted in the vehicle. The 12 V power storage apparatus 23 is a battery that has a rated voltage of 12 V.

The voltage units 2 (that is, the high-voltage battery 21, the alternating-current power supply 22, and the 12 V power storage apparatus 23) are respectively connected to power-conversion circuit units 3 that differ from one another.

Figure 3:
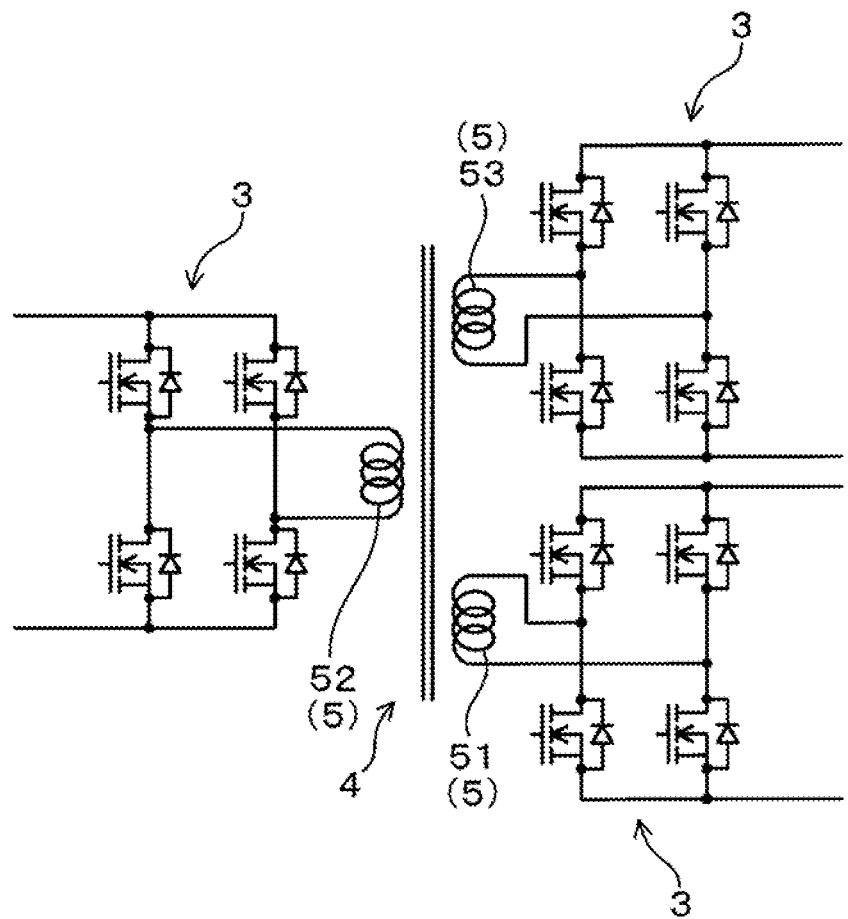
FIG. 3 is a circuit configuration diagram of an example of the transformer and three power-conversion circuit units.

As shown in FIG. 3, the power-conversion circuit units 3 can be those which include a plurality of power conversion elements. For example, as the power conversion element, a switching element such as a metal-oxide-semiconductor field-effect transistor (MOSFET), an insulated-gate bipolar transistor (IGBT), or a diode that has a switching function may be used. However, the power conversion element is not limited thereto.

The power-conversion circuit unit 3 converts a rectangular-wave current that is inputted from the connected coil 5 side to a direct-current current and outputs the direct-current current to a side opposite the coil 5. Furthermore, the power-conversion circuit unit 3 is also configured to be capable of converting a direct-current current that is inputted from the connected voltage unit 2 side to a rectangular-wave current and outputting the rectangular-wave current to the coil 5 side.

The power-conversion circuit units 3 each have a bridge circuit configuration. That is, the power conversion apparatus 1 according to the present embodiment configures a Multiple Active Bridge (MAB) by the transformer 4 and the three power-conversion circuit units 3.

As shown in FIG. 3, for example, at least one of the power-conversion circuit units 3 may have a full-bridge circuit configuration. This is not limited thereto. At least one of the power-conversion circuit units 3 can be that which has a half-bridge circuit configuration. As described above, the three power-conversion circuit units 3 are respectively connected to coils 5 that differ from one another.

According to the present embodiment, the power value that flows to the high-voltage battery 12 and the power value that flows to the alternating-current power supply 22 are substantially equal. In addition, the power value that flows to the 12 V power storage apparatus 23 is smaller than each of the power value that flows to the high-voltage battery 21 and the power value that flows to the alternating-current power supply 22.

In addition, the power value that flows to the high-voltage battery-side coil 51 and the power value that flows to the alternating-current power supply-side coil 52 are substantially equal. Furthermore, the power value that flows to the 12 V power storage apparatus-side coil 53 is smaller than each of the power value that flows the high-voltage battery-side coil 51 and the power value that flows to the alternating-current power supply-side coil 52. In the coils 5, a voltage that is applied is correlated with a number of turns in the coil 5 and a current that flows is correlated with a wire diameter of the coil 5. The power value that flows to the coil 5 can be evaluated based on a product of the number of turns and the wire diameter of the coil 5.

As shown in FIG. 1, the plurality (three, according to the present embodiment) of coils 5 are arranged so as to be arrayed in the coil axial direction Z. The plurality of coils 5 (three, according to the present embodiment) are formed coaxially with one another. Here, the coil axial direction Z is a direction in which a winding axis of the high-voltage battery-side coil 51 extends.

As shown in FIG. 1, the three coils 5 are arranged in order of the high-voltage battery-side coil 51, the alternating-current power supply-side coil 52, and the 12 V power storage apparatus-side coil 53, from one side in the coil axial direction Z. That is, the alternating-current power supply-side coil 52 and the 12 V power storage apparatus-side coil 53 are arranged in order of the alternating-current power supply-side coil 52 and the 12 V power storage apparatus-side coil 53 from a side closer to the high-voltage battery-side coil 51. In addition, the transformer 4 is arranged in a periphery of the coils 5 and includes a core 41 that forms a closed magnetic path.

The core 41 is composed of a magnetic body such as ferrite. As shown in FIG. 1, the core 41 is configured by a combination of a pair of segmented cores 410 that are respectively arranged on both sides in the coil axial direction Z. According to the present embodiment, the pair of segmented cores 412 have shapes that are similar to each other. The segmented core 410 includes a base portion 411, and an inner leg portion 412 and a pair of outer leg portions 413 that extend from the base portion 411.

As shown in FIG. 1, the base portion 411 is formed on a plane that is orthogonal to the coil axial direction Z. The base portion 411 is elongated in a direction that is orthogonal to the coil axial direction Z and is formed into a rectangular plate shape that has a thickness in the coil axial direction Z. Respective base portions 411 of the pair of segmented cores 410 oppose each other in the coil axial direction Z.

As shown in FIG. 1, the inner leg portion 412 and the pair of outer leg portions 413 of the segmented core 410 protrude from the base portion 411 of the segmented core 410 towards the other segmented core 410 in the coil axial direction Z.

As shown in FIG. 1, the inner leg portions 412 of the two segmented cores 410 are inserted into an inner circumferential side of three coils 5 in a coil radial direction. The pair of outer leg portions 413 are formed on both ends of the base portion 411 in a long direction of the base portion 411. The pair of outer leg portions 413 are formed on both outer sides of the three coils 5 in the long direction of the base portion 411.

Next, working effects according to the present embodiment will be described.

In the power conversion apparatus 1 according to the present embodiment, of the coils 5 other than the high-voltage battery-side coil 51, the coil 5 of which the power value that flows thereto is the largest is arranged in a position that is adjacent to the high-voltage battery-side coil 51. Here, magnetic coupling with the high-voltage battery-side coil 51 can be strengthened as the coil 5 becomes closer to the high-voltage battery-side coil 51. Therefore, as a result of this arrangement being used, the coil 5 that performs transmission of high power with the high-voltage battery-side coil 51 can be placed closer to the high-voltage battery-side coil 51. Transmission of electric power can be efficiently performed.

In addition, the plurality of coils 5 are arrayed in the coil axial direction Z on one side of the high-voltage battery-side coil 51. The plurality of coils 5 are arranged such that the coil 5 of which the power value that flows thereto is larger is arranged on the side closer to the high-voltage battery-side coil 51. Therefore, the coil of which power that is transmitted between the coil and the high-voltage battery-side coil 51 is large is arranged in a position close to the high-voltage battery-side coil 51 and magnetic coupling with the high-voltage battery-side coil 51 is strengthened. Meanwhile, as a result of the coil 5 of which power that is transmitted between the coil 5 and the high-voltage battery-side coil 51 is relatively small being arranged away from the high-voltage battery-side coil 51, leakage inductance can be ensured and a function as a reactor can be ensured. Consequently, as a result of the coils 5 being arranged as described above, power transmission from the high-voltage battery-side coil 51 to the other coils 5 by electromagnetic induction can be efficiently performed.

According to the present embodiment, the power value that flows to the alternating-current power supply-side coil 52 is equal to that of the high-voltage battery-side coil 51, and the power value that flows to the 12 V power storage apparatus-side coil 53 is relatively small. Here, according to the present embodiment, the alternating-current power supply-side coil 52 and the 12 V power storage apparatus-side coil 53 are arranged in order of the alternating-current power supply-side coil 52 and the 12 V power storage apparatus-side coil 53 from the side closer to the high-voltage battery-side coil 51. Therefore, transmission of high power between the alternating-current power supply-side coil 52 and the high-voltage battery-side coil 51 of which the power values that flow are large can be easily performed. In addition, as a result of the 12 V power storage apparatus-side coil 53 of which the power value that flows is relatively small being separated from the high-voltage battery-side coil 51, leakage inductance is ensured in the 12 V power storage apparatus-side coil 53.

As described above, according to the present embodiment, a power conversion apparatus that includes a transformer that has three or more coils in which the power conversion apparatus is capable of efficiently performing power transmission between the coils can be provided.

Second Embodiment

Figure 4:
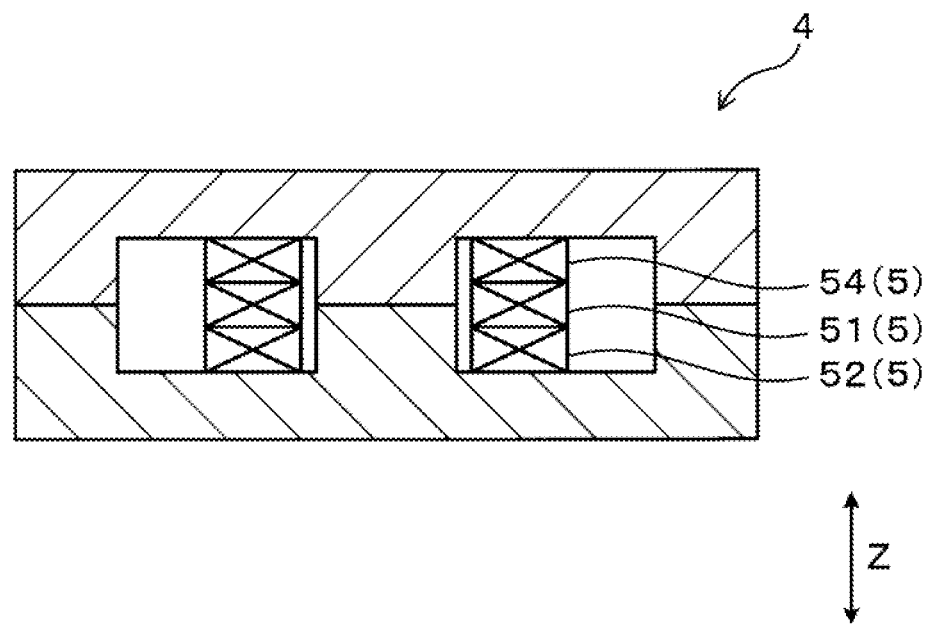
FIG. 4 is a schematic cross-sectional view of a transformer according to a second embodiment.
Figure 5:
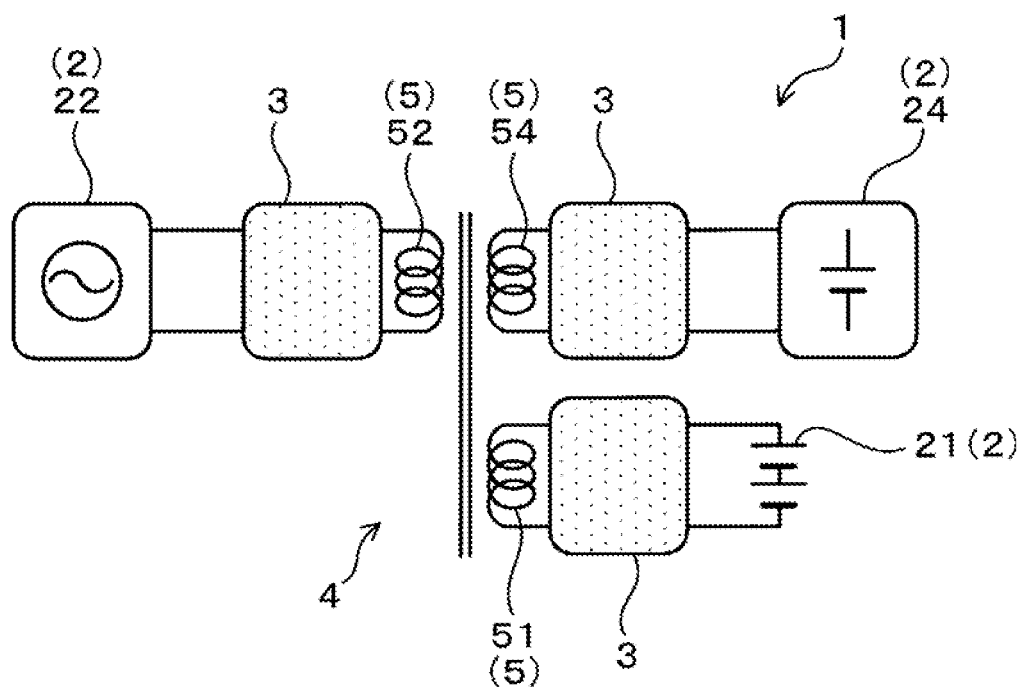
FIG. 5 is a circuit configuration diagram of a power conversion apparatus according to the second embodiment.

As shown in FIG. 4 and FIG. 5, a present embodiment is the power conversion apparatus 1 that is connected to three voltage units 2 that are the high-voltage battery 21, the alternating-current power supply 22, and a direct-current power supply 24.

The direct-current power supply 24 is a type of power supply unit for supplying power to the high-voltage battery 21 from outside the vehicle. The direct-current power supply 24 can be a power supply for charging that is capable of charging by direct-current power. For example, a direct-current charger such as a power supply station may be assumed as the direct-current power supply 24. In addition, the coil 5 that is electrically connected to the direct-current power supply 24 with the power-conversion circuit unit 3 therebetween is referred to as a direct-current power supply-side coil 54.

According to the present embodiment, the power values that respectively flow to the high-voltage battery 21, the alternating-current power supply 22, and the direct-current power supply 24 are substantially equal to one another. In addition, the power values that respectively flow to the high-voltage battery-side coil 51, the alternating-current power supply-side coil 52, and the direct-current power supply-side coil 54 are substantially equal to one another.

As shown in FIG. 4, the three coils 5 are arranged in order of the direct-current power supply-side coil 54, the high-voltage battery-side coil 51, and the alternating-current power supply-side coil 52, from one side in the coil axial direction Z. That is, the alternating-current power supply-side coil 52 and the direct-current power supply-side coil 54 are arranged so as to be adjacent to both sides of the high-voltage battery-side coil 51 in the coil axial direction Z.

Other configurations are similar to those according to the first embodiment.

Here, names and reference numbers of constituent elements used according to the second and subsequent embodiments that are the same as the names and reference numbers of constituent elements used according to earlier embodiments indicate constituent elements and the like that are similar to those according to the earlier embodiments, unless otherwise stated.

According to the present embodiment, the power values that respectively flow to the alternating-current power supply-side coil 52 and the direct-current power supply-side coil 54 are equal to that of the high-voltage battery-side coil 51. In addition, the alternating-current power supply-side coil 52 and the direct-current power supply-side coil 54 are arranged so as to be adjacent to both sides of the high-voltage battery-side coil 51 in the coil axial direction Z. Therefore, transmission of high power between both of the alternating-current power supply-side coil 52 and the direct-current power supply-side coil 54 of which the power values that flows are large, and the high-voltage battery-side coil 51 is easily performed. Consequently, power transmission between a plurality of coils 5 can be efficiently performed.

In addition, working effects similar to those according to the first embodiment are achieved.

Third Embodiment

Figure 6:
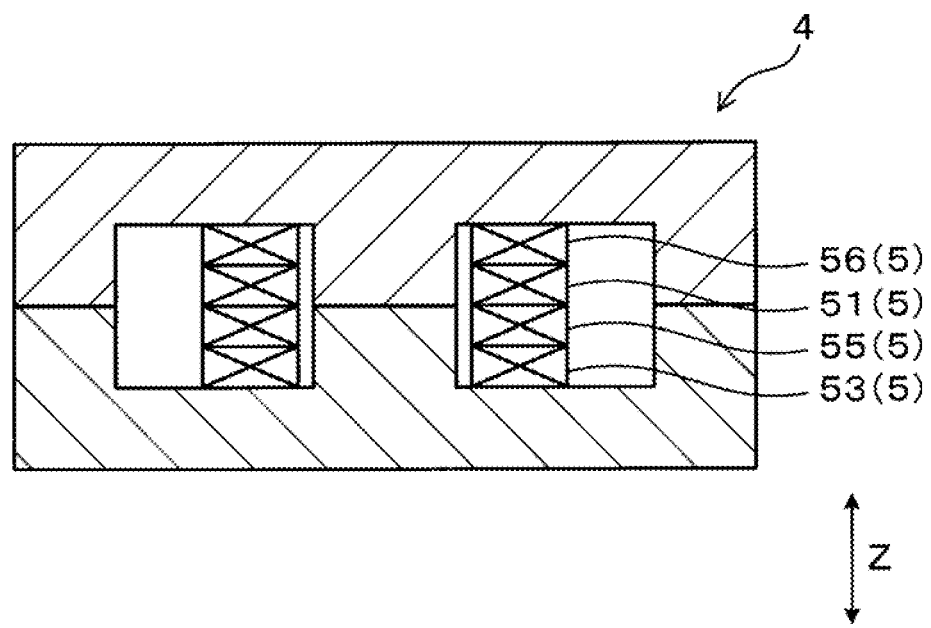
FIG. 6 is a schematic cross-sectional view of a transformer according to a third embodiment.
Figure 7:
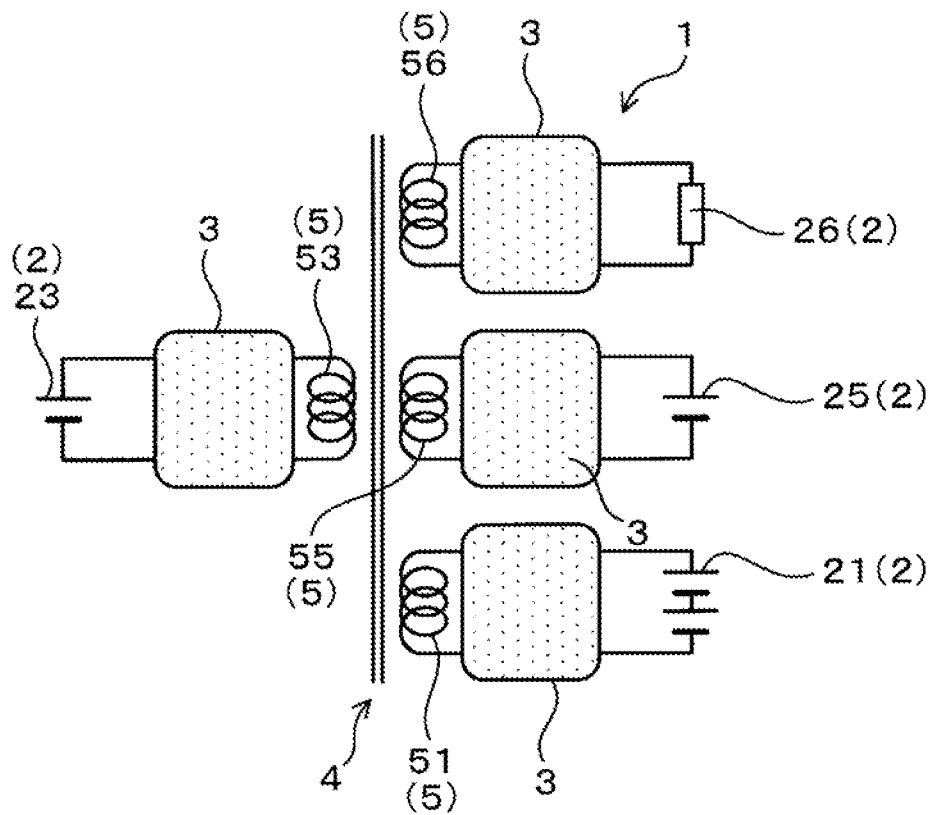
FIG. 7 is a circuit configuration diagram of a power conversion apparatus according to third and fourth embodiments.

As shown in FIG. 6 and FIG. 7, a present embodiment is the power conversion apparatus 1 that is electrically connected to four voltage units 3 that are the high-voltage battery 21, the 12 V power storage apparatus 23, a second power storage apparatus 25 that serves as a power storage apparatus, and a heater 26.

The second power storage apparatus 25 is a power storage apparatus that has a higher voltage than the 12 V power storage apparatus 23. The second power storage apparatus 25 can be a battery that has a rated voltage of 60 V or lower. Hereafter, the coil 5 that is electrically connected to the second power storage apparatus 25 with the power-conversion circuit unit 3 therebetween is referred to as a second power storage apparatus-side coil 55.

For example, as the heater 26, a heater for heating an electrically heated catalyst that is provided in an exhaust system of a hybrid car or the like may be used. In addition, as the heater 26, a heater for heating seats and the like, a heater for heating a battery such as the high-voltage battery 21, and the like can be used. Alternatively, as the heater 26, a water heating heater that heats cooling water of a high-voltage battery may be used. Hereafter, the coil 5 that is electrically connected to the heater 26 with the power-conversion circuit unit 3 therebetween is referred to as a heater-side coil 56.

According to the present embodiment, the power values that respectively flow to the four voltage units 2 are such that the power value of the heater 26 is the largest and the power value of the 12 V power storage apparatus 23 is the smallest. The power value that flows to the high-voltage battery 21 is equal to the power value of the second power storage apparatus 25. According to the present embodiment, an absolute value of a difference in power value between the high-voltage battery 21 and the second power storage apparatus 25 is equal to an absolute value of a difference in power value between the high-voltage battery 21 and the heater 26.

The power values that respectively flow to the four coils 5 are such that the power value of the heater-side coil 56 is the largest and the power value of the 12 V power storage apparatus-side coil 53 is the smallest. The power value that flows to the high-voltage battery-side coil 51 is equal to the power value that flows to the second power storage apparatus-side coil 55. In addition, the absolute value of the difference in power value between the high-voltage battery-side coil 51 and the second power storage apparatus-side coil 55 and the absolute value of the difference in power value between the high-voltage battery-side coil 51 and the heater-side coil 56 are equal.

As shown in FIG. 6, the four coils 5 are arranged in order of the heater-side coil 56, the high-voltage battery-side coil 51, the second power storage apparatus-side coil 55, and the 12 V power storage apparatus-side coil 53, from one side in the coil axial direction Z. That is, the heater-side coil 56 is arranged in a position that is adjacent to one side in the coil axial direction Z of the high-voltage battery-side coil 51, and the second power storage apparatus-side coil 55 is arranged in a position that is adjacent to the other side. In addition, the 12 V power storage apparatus-side coil 53 is arranged in a position that is farthest from the high-voltage battery side coil 51.

Other configurations are similar to those according to the first embodiment.

According to the present embodiment, the absolute value of the difference in power value between the high-voltage battery 21 and the second power storage apparatus 25 is equal to the absolute value of the difference in power value between the high-voltage battery 21 and the heater 26. In addition, the heater-side coil 56 is arranged in a position that is adjacent to one side in the coil axial direction Z of the high-voltage battery-side coil 51 and the second power storage apparatus-side coil 55 is arranged in a position that is adjacent to the other side. Therefore, transmission of high power between both of the heater side-coil 56 and the second power storage apparatus-side coil 55 of which the power values that flow are large, and the high-voltage battery-side coil 51, is easily performed. Meanwhile, as a result of the 12

V power storage apparatus-side coil 53 of which the power value that flows is relatively small being separated from the high-voltage battery-side coil 51, leakage inductance is ensured. Consequently, power transmission between a plurality of coils 5 can be efficiently performed.

In addition, working effects similar to those according to the first embodiment are achieved.

Here, according to the present embodiment, the arrangements of the heater-side coil 56 and the second power storage apparatus-side coil 55 in the coil axial direction Z may be interchanged. In this case as well, the above-described effects can be achieved.

Fourth Embodiment

A present embodiment is an embodiment in which, while the circuit configuration is identical to that according to the third embodiment, the power value that flows to the second power storage apparatus 25 is smaller than the power value that flows to the high-voltage battery 21. The circuit configuration of the power conversion apparatus 1 according to the present embodiment is similar to that shown in FIG. 7.

The four voltage units 2 are in order of the heater 26, the high-voltage battery 21, the second power storage apparatus 25, and the 12 V power storage apparatus 23, in order from the voltage unit 2 of which the power value that flows thereto is the largest. In addition, the absolute value of the difference in power value between the high-voltage battery 21 and the second power storage apparatus 25 is greater than the absolute value of the difference in power value between the high-voltage battery 21 and the heater 26.

The four coils 5 are in order of the heater-side coil 56, the high-voltage battery-side coil 51, the second power storage apparatus-side coil 55, and the 12 V power storage apparatus-side coil 53, from the side of which the power value that flows thereto is the largest. In addition, the absolute value of the difference in power value between the high-voltage battery-side coil 51 and the second power storage apparatus-side coil 55 is greater than the absolute value of the difference in power value between the high-voltage battery-side coil 51 and the heater-side coil 56.

Figure 8:
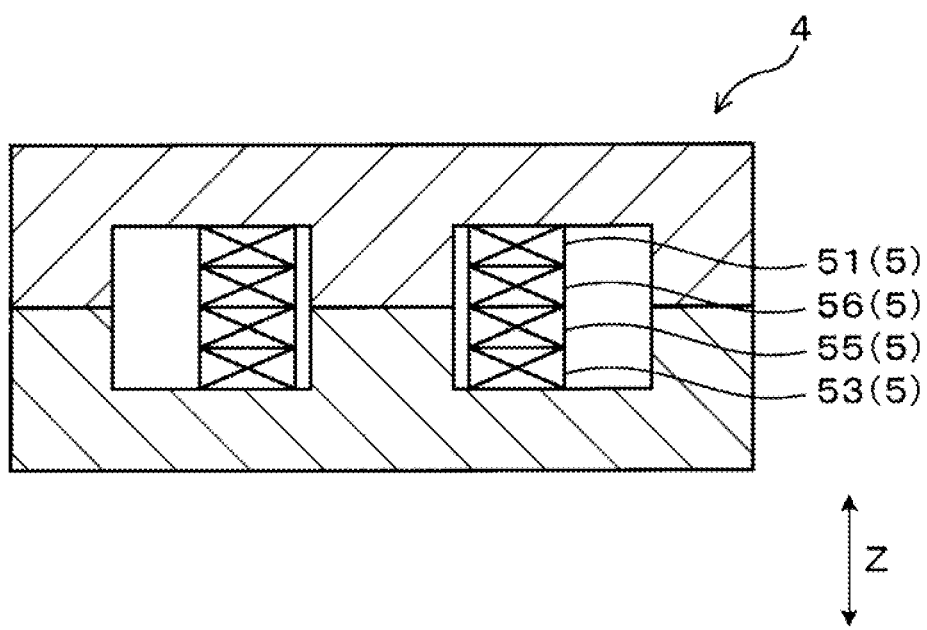
FIG. 8 is a schematic cross-sectional view of a transformer according to the fourth embodiment.

As shown in FIG. 8, the four coils 5 are arranged in order of the high-voltage battery-side coil 51, the heater-side coil 56, the second power storage apparatus-side coil 55, and the 12 V power storage apparatus-side coil 53, from one side in the coil axial direction Z.

Other configurations are similar to those according to the third embodiment.

According to the present embodiment as well, working effects similar to those according to the first embodiment are achieved.

Fifth Embodiment

Figure 9:
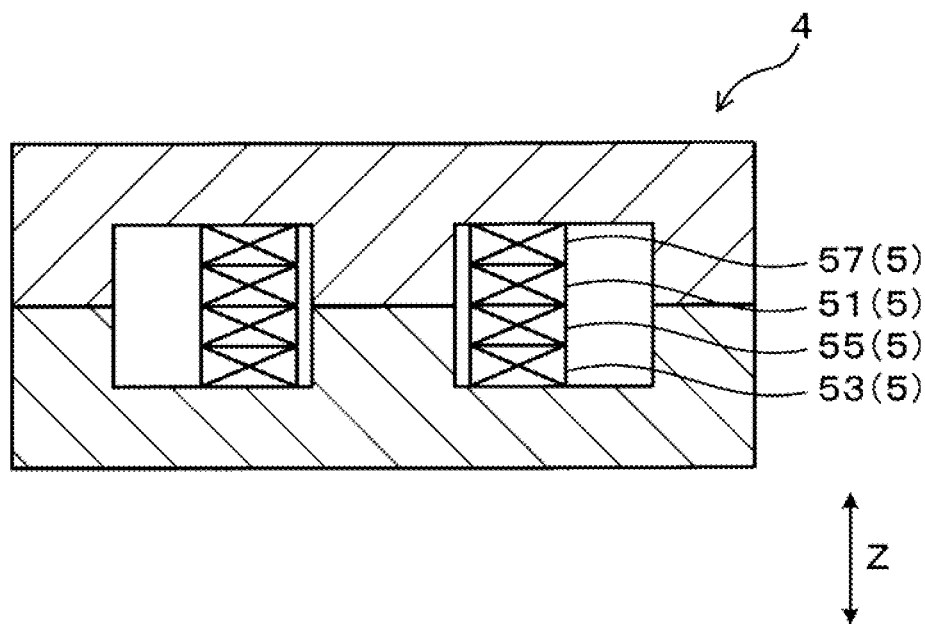
FIG. 9 is a schematic cross-sectional view of a transformer according to a fifth embodiment.
Figure 10:
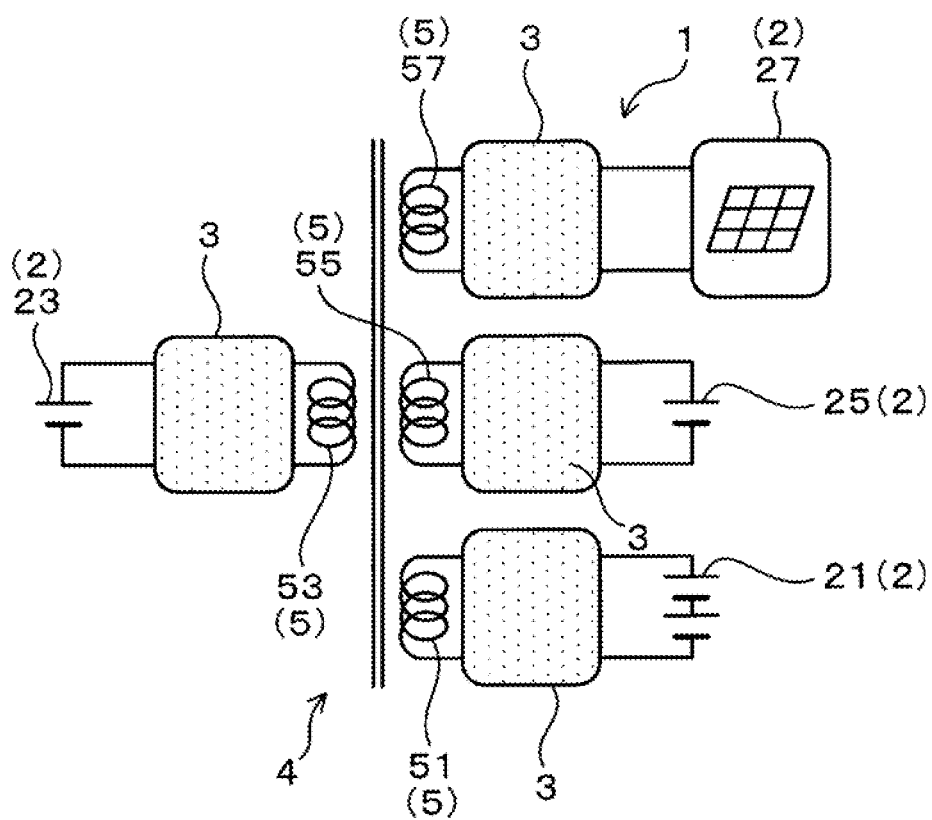
FIG. 10 is a circuit configuration diagram of a power conversion apparatus according to fifth and sixth embodiments.

As shown in FIG. 9 and FIG. 10, a present embodiment is the power conversion apparatus 1 that is connected to four voltage units 2 that are the high-voltage battery 21, the 12 V power storage apparatus 23, the second power storage apparatus 25, and a solar power supply 27.

The solar power supply 27 is a type of power supply unit for supplying power to the high-voltage battery 21 from outside the vehicle. For example, the solar power supply 27 may be a solar power generator that includes a solar panel that is arranged on a roof of the vehicle or the like. The solar power supply 27 can be a solar power generation apparatus that includes a maximum power point tracking (MPPT) function. In addition, the solar power supply 27 can also be a solar power generation apparatus that includes a pulse-width modulation (PWM) control function.

Here, conditions, such as time periods and weather, under which the solar power supply 27 can be used are limited. Therefore, this power supply is often used in combination with other power supplies and the like. Consequently, as a result of the solar power supply 27 being able to be connected to other plurality of voltage units 2 with a single transformer 4 therebetween, a number of components and physical size can be reduced as an overall system, such as a vehicle power supply system. The coil 5 that is electrically connected to the solar power supply 27 with the power-conversion circuit unit 3 therebetween is referred to as a solar power supply-side coil 57.

According to the present embodiment, the power values that respectively flow to the four voltage units 2 are, in order from the largest, those of the solar power supply 27, the high-voltage battery 21, the second power storage apparatus 25, and the 12 V power storage apparatus 23. The power values that respectively flow to the four coils 5 are, in order from the largest, those of the solar power supply-side coil 57, the high-voltage battery-side coil 51, the second power storage apparatus-side coil 55, and the 12 V power storage apparatus-side coil 53.

As shown in FIG. 9, the four coils 5 are arranged in order of the solar power supply-side coil 57, the high-voltage battery-side coil 51, the second power storage apparatus-side coil 55, and the 12 V power storage apparatus-side coil 53, from one side in the coil axial direction Z. That is, the solar power supply-side coil 57 is arranged in a position that is adjacent to one side in the coil axial direction Z of the high-voltage battery-side coil 51, and the second power storage apparatus 25 is arranged in a position that is adjacent to the other side. In addition, the 12 V power storage apparatus-side coil 53 is arranged in a position that is farthest from the high-voltage battery-side coil 51.

Other configurations are similar to those according to the first embodiment.

According to the present embodiment as well, working effects similar to those according to the first embodiment are achieved.

Sixth Embodiment

A present embodiment is an embodiment in which, while the circuit configuration is identical to that according to the fifth embodiment, the power value that flows to the second power storage apparatus 25 is equal to the power value that flows to the high-voltage battery 21. The circuit configuration of the power conversion apparatus 1 according to the present embodiment is similar to that shown in FIG. 10.

The power values that respectively flow to the four voltage units 2 are such that the power value of the solar power supply 27 is the largest and the power value of the 12 V power storage apparatus 23 is the smallest. In addition, the power values that respectively flow to the four coils 5 are such that the power value of the solar power supply-side coil 57 is the largest and the power value of the 12 V power storage apparatus-side coil 53 is the smallest. The power value that flows to the high-voltage battery-side coil 51 is equal to the power value of the second power storage apparatus-side coil 55.

Figure 11:
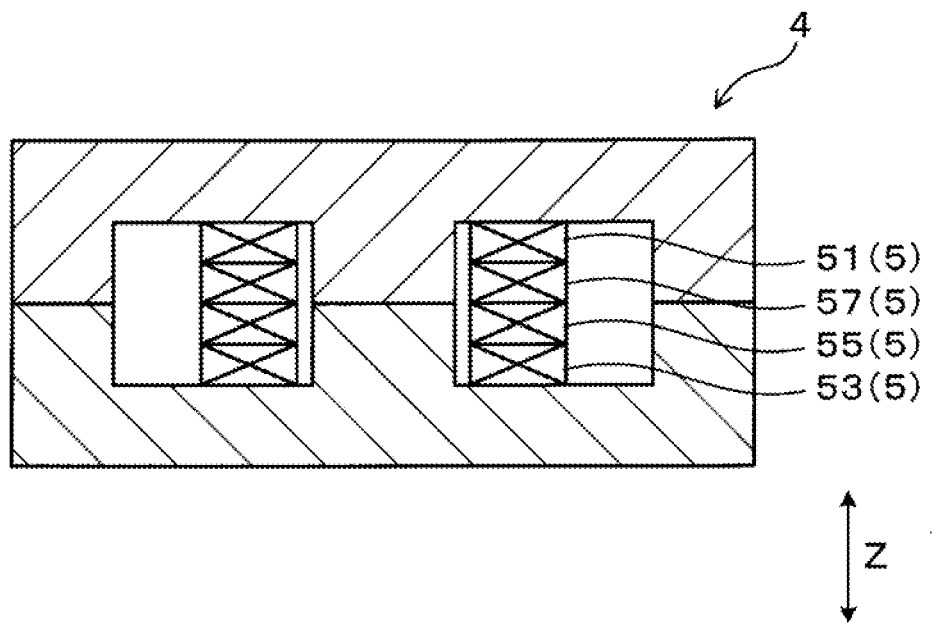
FIG. 11 is a schematic cross-sectional view of a transformer according to the sixth embodiment.

As shown in FIG. 11, the four coils 5 are arranged in order of the high-voltage battery-side coil 51, the solar power supply-side coil 57, the second power storage apparatus-side coil 55, and the 12 V power storage apparatus-side coil 53, from one side in the coil axial direction Z.

Other configurations are similar to those according to the fifth embodiment.

According to the present embodiment as well, working effects similar to those according to the first embodiment are achieved.

Seventh Embodiment

Figure 12:
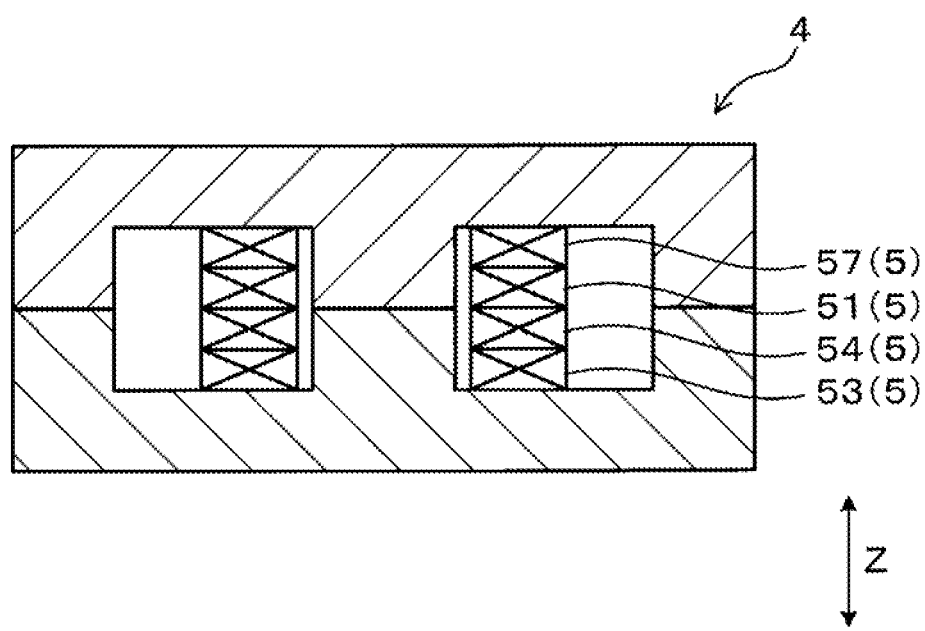
FIG. 12 is a schematic cross-sectional view of a transformer according to a seventh embodiment.
Figure 13:
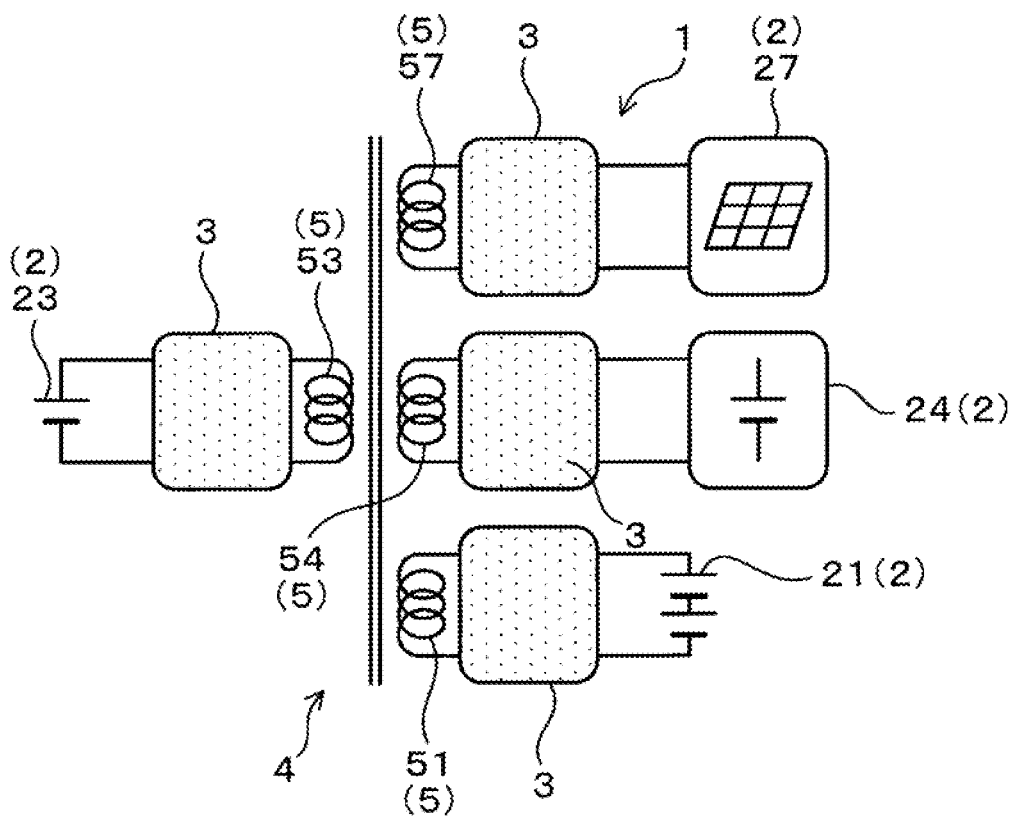
FIG. 13 is a circuit configuration diagram of a power conversion apparatus according to the seventh embodiment.

As shown in FIG. 12 and FIG. 13, a present embodiment is the power conversion apparatus 1 that is connected to four voltage units 2 that are the high-voltage battery 21, the 12 V power storage apparatus 23, the direct-current power supply 24, and the solar power supply 27.

According to the present embodiment, the power values that respectively flow to the four voltage units 2 are such that the power values of the high-voltage battery 21, the direct-current power supply 24, and the solar power supply 27 are equal, and the power value of the 12 V power storage apparatus 23 is the smallest. The power values that respectively flow to the four coils 5 are such that the power values of the high-voltage battery-side coil 51, the direct-current power supply-side coil 54, and the solar power supply-side coil 57 are equal, and the power value of the 12 V power storage apparatus-side coil 53 is the smallest. That is, of the coils 5 other than the high-voltage battery-side coil 51, the coil 5 of which the power value that flows thereto is the largest is at least either of the direct-current power supply-side coil 54 and the solar power supply-side coil 57.

As shown in FIG. 12, the four coils 5 are arranged in order of the solar power supply-side coil 57, the high-voltage battery-side coil 51, the direct-current power supply-side coil 54, and the 12 V power storage apparatus-side coil 53, from one side in the coil axial direction Z. That is, the solar power supply-side coil 57 is arranged in a position that is adjacent to one side in the coil axial direction Z of the high-voltage battery-side coil 51 and the direct-current power supply side coil 54 is arranged in a position that is adjacent to the other side. In addition, the 12 V power storage apparatus-side coil 53 is arranged in a position that is farthest from the high-voltage battery-side coil 51.

Other configurations are similar to those according to the first embodiment.

According to the present embodiment, the power values that respectively flow to the four coils 5 are such that the power values of the high-voltage battery-side coil 51, the direct-current power supply-side coil 54, and the solar power supply-side coil 57 are equal, and the power value of the 12 V power storage apparatus-side coil 53 is the smallest. Here, the solar power supply-side coil 57 and the direct-current power supply-side coil 54 are mainly used as power-transmitting-side coils, and the high-voltage battery-side coil 51 is mainly used as a power-receiving-side coil.

Here, according to the present embodiment, the solar power supply-side coil 57 is arranged in a position that is adjacent to one side in the coil axial direction Z of the high-voltage battery-side coil 51 and the direct-current power supply-side coil 54 is arranged in a position that is adjacent to the other side. Therefore, transmission of high power between both of the solar power supply-side coil 57 and the direct-current power supply-side coil 54 on the power transmitting side, and the high-voltage battery-side coil 51 on the power receiving side is easily performed. In addition, as a result of the 12 V power storage apparatus-side coil 53 of which the power value that flows thereto is relatively small being separated from the high-voltage battery-side coil 51, leakage inductance is ensured. Consequently, power transmission between a plurality of coils 5 can be efficiently performed.

In addition, working effects similar to those according to the first embodiment are achieved.

Here, according to the present embodiment, the arrangements of the solar power supply-side coil 57 and the direct-current power supply-side coil 54 in the coil axial direction Z may be interchanged. In this case as well, the above-described effects can be achieved.

Eighth Embodiment

Figure 14:
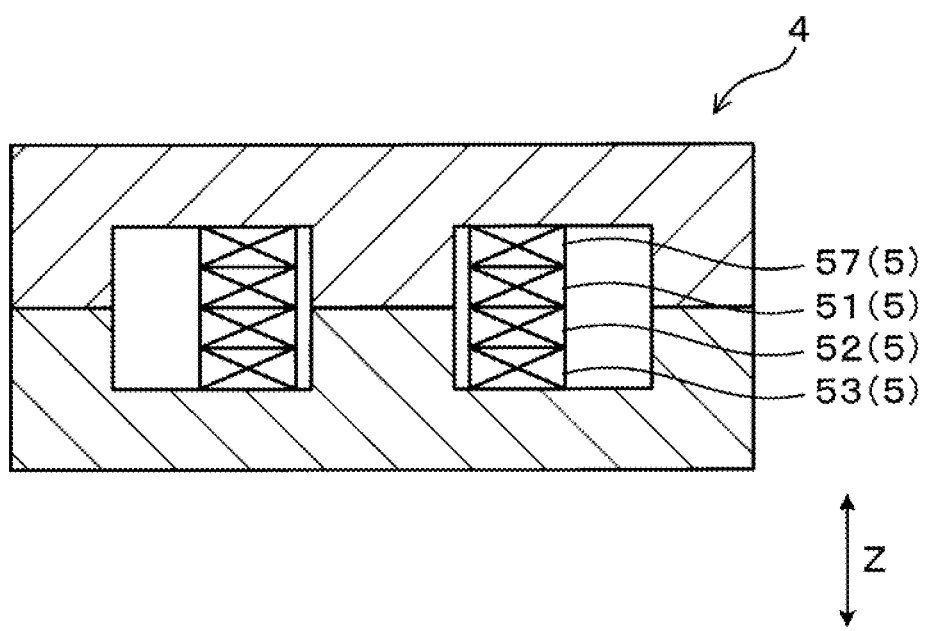
FIG. 14 is a schematic cross-sectional view of a transformer according to an eighth embodiment.
Figure 15:
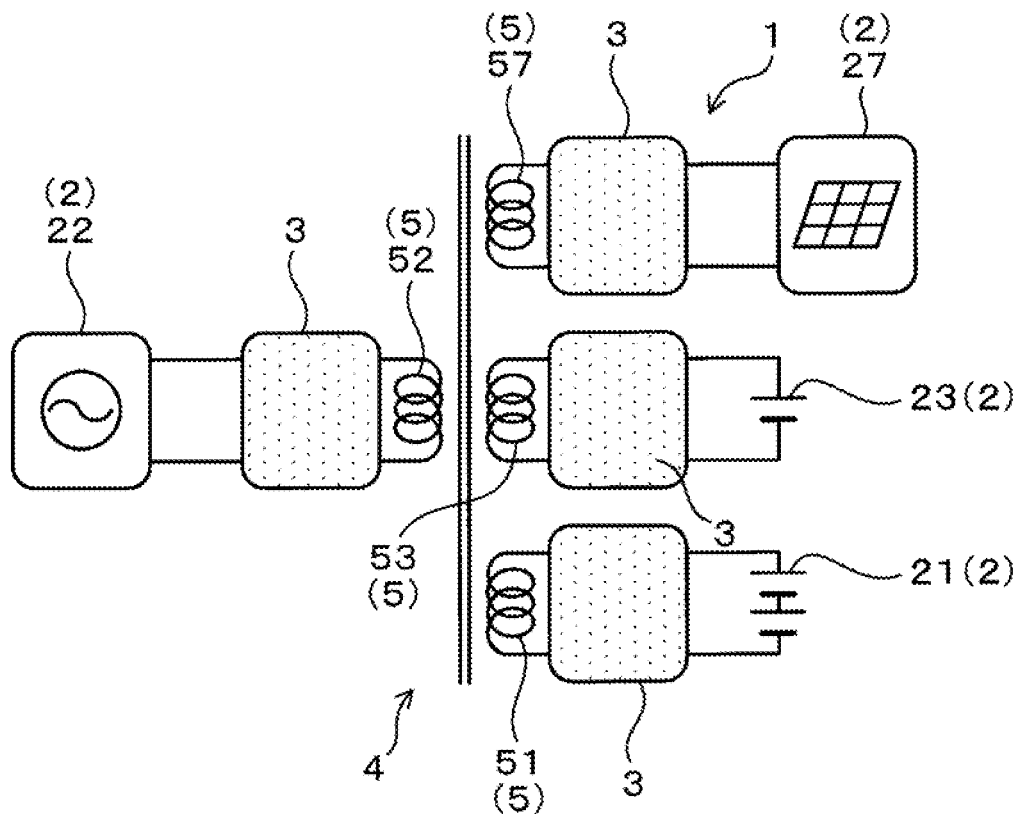
FIG. 15 is a circuit configuration diagram of a power conversion apparatus according to the eighth embodiment.

As shown in FIG. 14 and FIG. 15, a present embodiment is the power conversion apparatus 1 that is connected to four voltage units 2 that are the high-voltage battery 21, the 12 V power storage apparatus 23, the alternating-current power supply 22, and the solar power supply 27.

According to the present embodiment, the power values that respectively flow to the four voltage units 2 are such that the power values of the high-voltage battery 21, the alternating-current power supply 22, and the solar power supply 27 are equal, and the power value of the 12 V power storage apparatus 23 is the smallest. The power values that respectively flow to the four coils 5 are such that the power values of the high-voltage battery-side coil 51, the alternating-current power supply-side coil 52, and the solar power supply-side coil 57 are equal, and the power value of the 12 V power storage apparatus-side coil 53 is the smallest. That is, of the coils 5 other than the high-voltage battery-side coil 51, the coil 5 of which the power value that flows thereto is the largest is at least either of the alternating-current power supply-side coil 52 and the solar power supply-side coil 57.

As shown in FIG. 14, the four coils 5 are arranged in order of the solar power supply-side coil 57, the high-voltage battery-side coil 51, the alternating-current power supply-side coil 52, and the 12 V power storage apparatus-side coil 53, from one side in the coil axial direction Z. That is, the solar power supply-side coil 57 is arranged in a position that is adjacent to one side in the coil axial direction Z of the high-voltage battery-side coil 51 and the alternating-current power supply side coil 52 is arranged in a position that is adjacent to the other side. In addition, the 12 V power storage apparatus-side coil 53 is arranged in a position that is farthest from the high-voltage battery-side coil 51.

Other configurations are similar to those according to the first embodiment.

According to the present embodiment, the power values that respectively flow to the four coils 5 are such that the power values of the high-voltage battery-side coil 51, the alternating-current power supply-side coil 52, and the solar power supply-side coil 57 are equal, and the power value of the 12 V power storage apparatus-side coil 53 is the smallest. Here, the solar power supply-side coil 57 and the alternating-current power supply-side coil 52 are mainly used as power-transmitting-side coils, and the high-voltage battery-side coil 51 is mainly used as a power-receiving-side coil.

Here, according to the present embodiment, the solar power supply-side coil 57 is arranged in a position that is adjacent to one side in the coil axial direction Z of the high-voltage battery-side coil 51 and the alternating-current power supply-side coil 52 is arranged in a position that is adjacent to the other side. Therefore, transmission of high power between both of the solar power supply-side coil 57 and the alternating-current power supply-side coil 52 on the power transmitting side, and the high-voltage battery-side coil 51 on the power receiving side is easily performed. In addition, as a result of the 12 V power storage apparatus-side coil 53 of which the power value that flows thereto is relatively small being separated from the high-voltage battery-side coil 51, leakage inductance is ensured. Consequently, power transmission between a plurality of coils 5 can be efficiently performed.

In addition, working effects similar to those according to the first embodiment are achieved.

Here, according to the present embodiment, the arrangements of the solar power supply-side coil 57 and the alternating-current power supply-side coil 52 in the coil axial direction Z may be interchanged. In this case as well, the above-described effects can be achieved.

Ninth Embodiment

Figure 16:
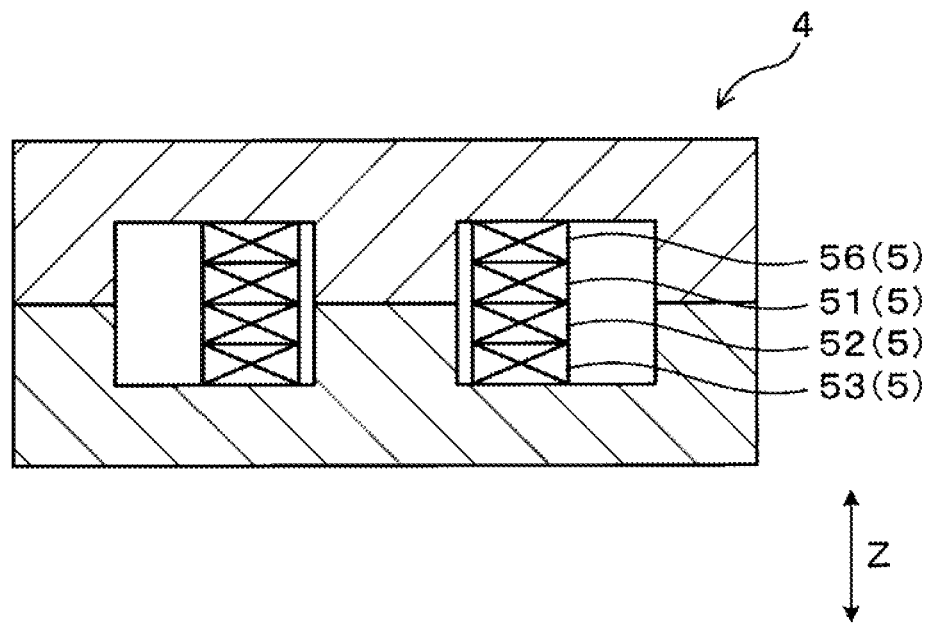
FIG. 16 is a schematic cross-sectional view of a transformer according to a ninth embodiment.
Figure 17:
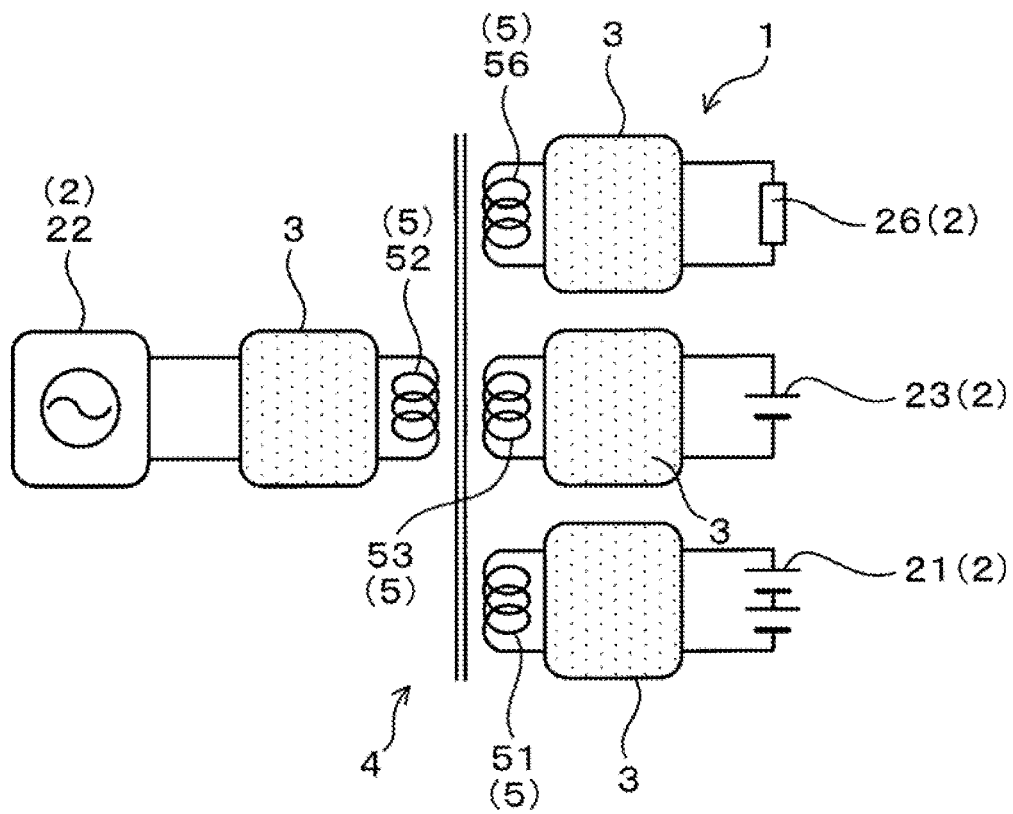
FIG. 17 is a circuit configuration diagram of a power conversion apparatus according to the ninth embodiment.

As shown in FIG. 16 and FIG. 17, a present embodiment is the power conversion apparatus 1 that is connected to four voltage units 2 that are the high-voltage battery 21, the heater 26, the alternating-current power supply 22, and the 12 V power storage apparatus 23.

According to the present embodiment, the power values that respectively flow to the four voltage units 2 are such that the power value of the heater 26 is the largest and the power value of the 12 V power storage apparatus 23 is the smallest. The power value that flows to the high-voltage battery 21 is equal to the power value that flows to the alternating-current power supply 22.

The power values that respectively flow to the four coils 5 are such that the power value of the heater-side coil 56 is the largest and the power value of the 12 V power storage apparatus-side coil 53 is the smallest. The power value that flows to the high-voltage battery-side coil 51 is equal to the power value that flows to the alternating-current power supply-side coil 52.

As shown in FIG. 16, the four coils 5 are arranged in order of the heater-side coil 56, the high-voltage battery-side coil 51, the alternating-current power supply-side coil 52, and the 12 V power storage apparatus-side coil 53, from one side in the coil axial direction Z. That is, the heater-side coil 56 is arranged in a position that is adjacent to one side in the coil axial direction Z of the high-voltage battery-side coil 51 and the alternating-current power supply-side coil 52 is arranged in a position that is adjacent to the other side. In addition, the 12 V power storage apparatus-side coil 53 is arranged in a position that is farthest from the high-voltage battery-side coil 51.

Other configurations are similar to those according to the first embodiment.

According to the present embodiment, the power values that respectively flow to the four coils 5 are such that the power value of the heater-side coil 56 is the largest and the power value of the 12 V power storage apparatus-side coil 53 is the smallest. In addition, the power value that flows to the high-voltage battery-side coil 51 is equal to the power value of the the alternating-current power supply-side coil 52. Furthermore, in general, a flow path of electric power is often a path from the alternating-current power supply 22 towards the high-voltage battery 21 and a path from the high-voltage battery 21 towards the heater 26.

Here, according to the present embodiment, the heater-side coil 56 is arranged in a position that is adjacent to one side in the coil axial direction Z of the high-voltage battery-side coil 51 and the alternating-current power supply-side coil 52 is arranged in a position that is adjacent to the other side. Therefore, transmission of high power between both of the heater-side coil 56 and the alternating-current power supply-side coil 52, and the high-voltage battery-side coil 51 is easily performed. Meanwhile, as a result of the 12 V power storage apparatus-side coil 53 of which the power value that flows is relatively small being separated from the high-voltage battery-side coil 51, leakage inductance is ensured. Consequently, power transmission between a plurality of coils 5 can be efficiently performed.

In addition, working effects similar to those according to the first embodiment are achieved.

Here, according to the present embodiment, the arrangements of the heater-side coil 56 and the alternating-current power supply-side coil 52 in the coil axial direction Z may be interchanged. In this case as well, the above-described effects can be achieved.

Tenth Embodiment

Figure 18:
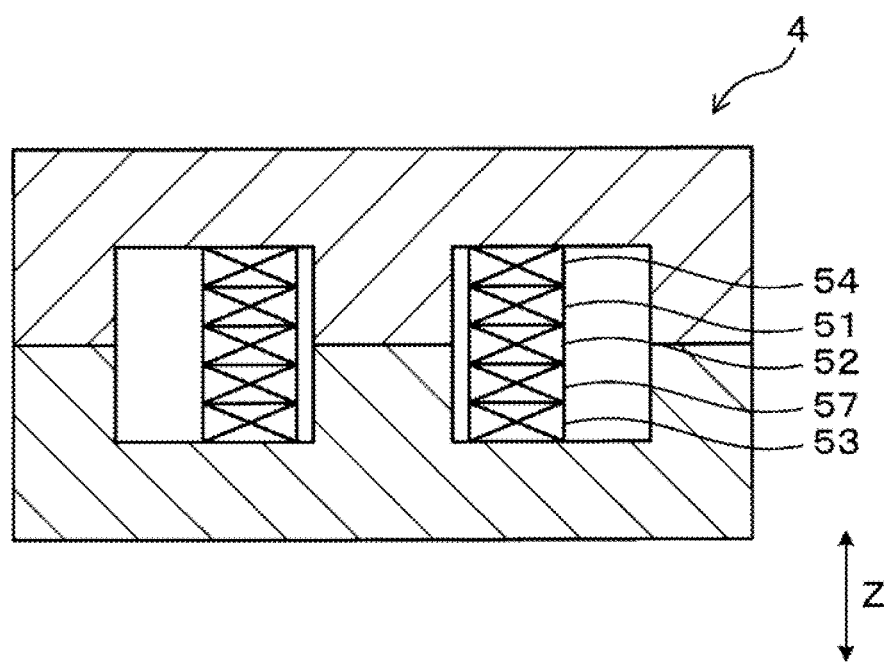
FIG. 18 is a schematic cross-sectional view of a transformer according to a tenth embodiment.
Figure 19:
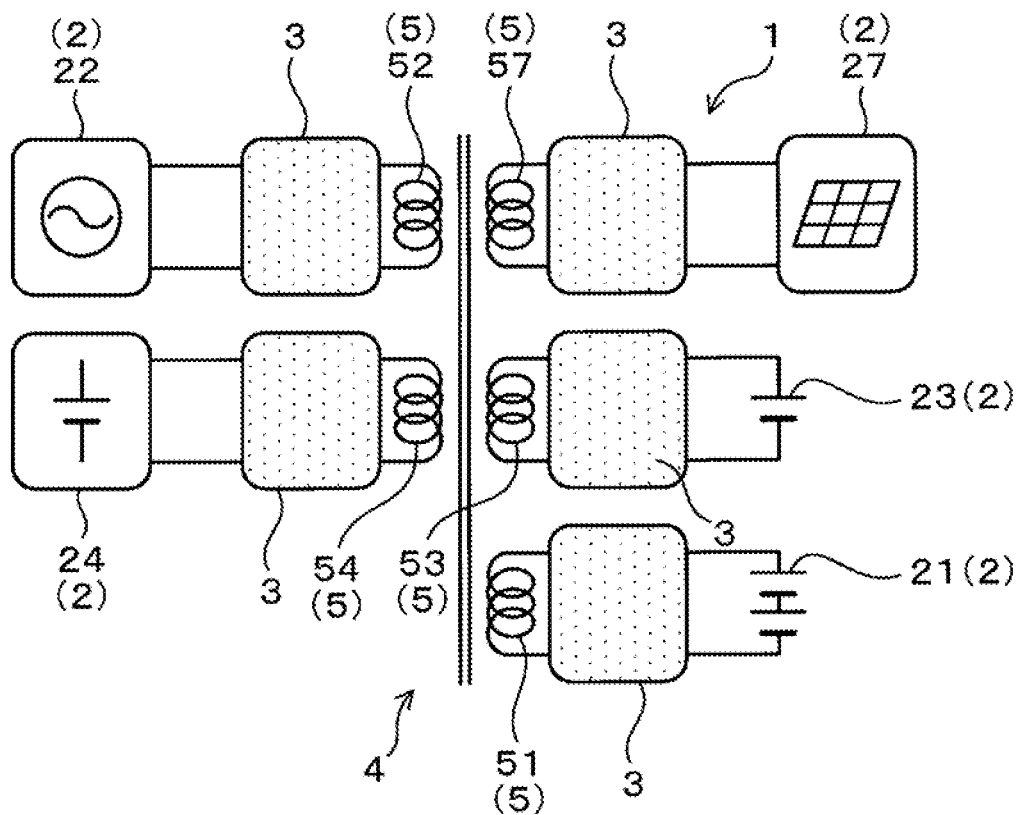
FIG. 19 is a circuit configuration diagram of a power conversion apparatus according to the tenth embodiment.

As shown in FIG. 18 and FIG. 19, a present embodiment is the power conversion apparatus 1 that is connected to five voltage units 2 that are the high-voltage battery 21, the direct-current power supply 24, the alternating-current power supply 22, the solar power supply 27, and the 12 V power storage apparatus 23.

According to the present embodiment, the power values that respectively flow to the five voltage units 2 are such that the power value of the 12 V power storage apparatus 23 is the smallest and the power value of the solar power supply 27 is the second smallest. Meanwhile, as the power values that respectively flow to the high-voltage battery 21, the direct-current power supply 24, and the alternating-current power supply 22, various power values can be used.

The power values that respectively flow to the five coils 5 are such that the power value of the 12 V power storage apparatus-side coil 53 is the smallest and the power value of the solar power supply-side coil 57 is the second smallest. That is, of the coils 5 other than the high-voltage battery-side coil 51, the coil 5 of which the power value that flows thereto is the largest is at least either of the direct-current power supply-side coil 54 and the alternating-current power supply-side coil 52. The power values that respectively flow to the high-voltage battery-side coil 51, the direct-current power supply-side coil 54, and the alternating-current power supply-side coil 52 are determined in accompaniment with the voltage unit 2 that is connected to each coil 5.

As shown in FIG. 18, the five coils 5 are arranged in order of the direct-current power supply-side coil 54, the high-voltage battery-side coil 51, the alternating-current power supply-side coil 52, the solar power supply-side coil 57, and the 12 V storage apparatus-side coil 53, from one side in the coil axial direction Z. That is, the direct-current power supply-side coil 54 is arranged in a position that is adjacent to one side in the coil axial direction Z of the high-voltage battery-side coil 51 and the alternating-current power supply-side coil 52 is arranged in a position that is adjacent to the other side. In addition, the 12 V power storage apparatus-side coil 53 is arranged in a position that is farthest from the high-voltage battery-side coil 51.

Other configurations are similar to those according to the first embodiment.

Transmission of electric power between the high-voltage battery 21 and both of the direct-current power supply 24 and the alternating-current power supply 22 is frequently performed. Here, according to the present embodiment, the direct-current power supply-side coil 54 is arranged in a position that is adjacent to one side in the coil axial direction Z of the high-voltage battery-side coil 51 and the alternating-current power supply-side coil 52 is arranged in a position that is adjacent to the other side. Consequently, the high-voltage battery-side coil 51, and the direct-current power supply-side coil 54 and the alternating-current power supply-side coil 52 of which the frequency of transmission of electric power is high can be arranged in nearby positions. Transmission of high power therebetween is easily performed.

In addition, the solar power supply 27 is mainly used during daytime. Not much transmission of electric power is performed between the solar power supply 27 and the high-voltage battery 21. Therefore, the solar power supply-side coil 57 is arranged on a side farther from the high-voltage battery-side coil 51 than the direct-current power supply-side coil 54 and the alternating-current power supply-side coil 52. Furthermore, as a result of the 12 V power storage apparatus-side coil 53 of which the power value that flows is relatively small being farthest from the high-voltage battery-side coil 51, leakage inductance is ensured. Consequently, power transmission between a plurality of coils 5 can be efficiently performed.

According to the present embodiment as well, effects similar to those according to the first embodiment are achieved.

Here, according to the present embodiment, the arrangements of the direct-current power supply-side coil 54 and the alternating-current power supply-side coil 52 in the coil axial direction Z may be interchanged. In this case as well, the above-described effects can be achieved.

Eleventh Embodiment

Figure 20:
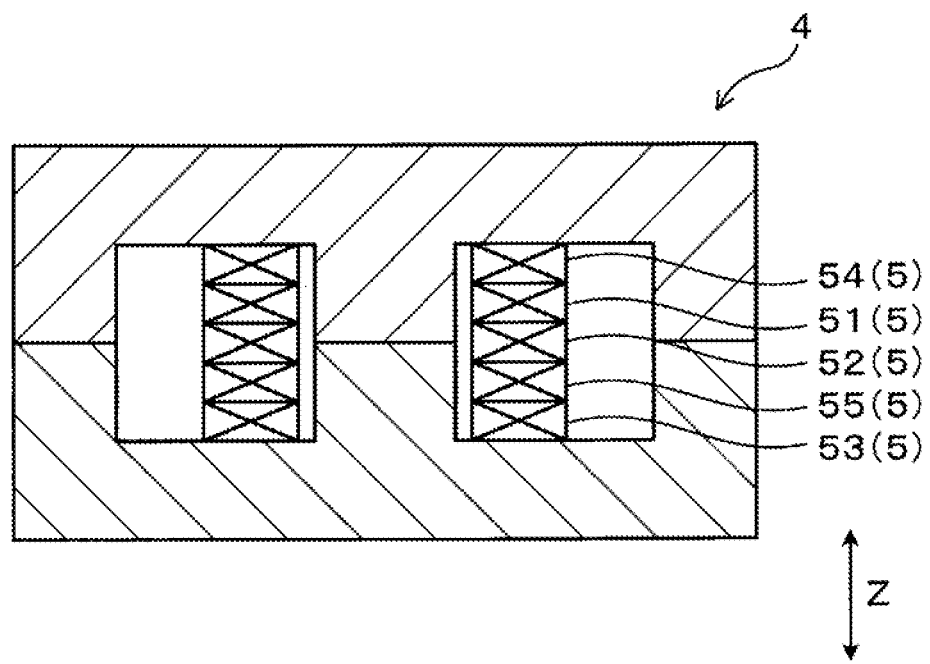
FIG. 20 is a schematic cross-sectional view of a transformer according to an eleventh embodiment.
Figure 21:
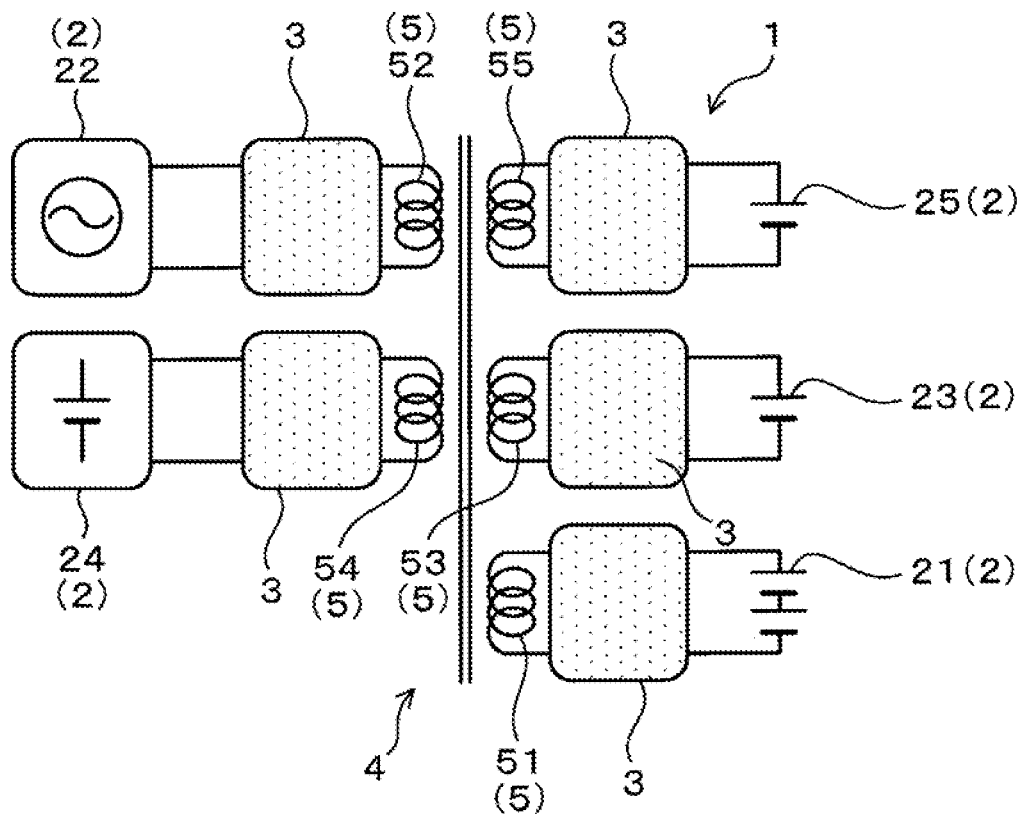
FIG. 21 is a circuit configuration diagram of a power conversion apparatus according to the eleventh embodiment.

As shown in FIG. 20 and FIG. 21, a present embodiment is the power conversion apparatus 1 that is connected to five voltage units 2 that are the high-voltage battery 21, the direct-current power supply 24, the alternating-current power supply 22, the second power storage apparatus 25, and the 12 V power storage apparatus 23.

According to the present embodiment, the power values that respectively flow to the five voltage units 2 are such that the power value of the 12 V power storage apparatus 23 is the smallest and the power value of the second power storage apparatus 25 is the second smallest. As the power values that respectively flow to the high-voltage battery 21, the direct-current power supply 24, and the alternating-current power supply 22, various power values that are larger than the power value that flows to the second power storage apparatus 25 can be used.

The power values that respectively flow to the five coils 5 are such that the power value of the 12 V power storage apparatus-side coil 53 is the smallest and the power value of the second power storage apparatus-side coil 55 is the second smallest. The power values that respectively flow to the high-voltage battery-side coil 51, the direct-current power supply-side coil 54, and the alternating-current power supply-side coil 52 are larger than the power value that flows to the second power storage apparatus-side coil 55 and are determined in accompaniment with the connected voltage units 2. That is, of the coils 5 other than the high-voltage battery-side coil 51, the coil 5 of which the power value that flows thereto is the largest is at least either of the direct-current power supply-side coil 54 and the alternating-current power supply-side coil 52.

As shown in FIG. 20, the five coils 5 are arranged in order of the direct-current power supply-side coil 54, the high-voltage battery-side coil 51, the alternating-current power supply-side coil 52, the second power storage apparatus-side coil 55, and the 12 V storage apparatus-side coil 53, from one side in the coil axial direction Z. That is, the direct-current power supply-side coil 54 is arranged in a position that is adjacent to one side in the coil axial direction Z of the high-voltage battery-side coil 51 and the alternating-current power supply-side coil 52 is arranged in a position that is adjacent to the other side. In addition, the 12 V power storage apparatus-side coil 53 is arranged in a position that is farthest from the high-voltage battery-side coil 51.

Other configurations are similar to those according to the first embodiment.

According to the present embodiment, as the power values that respectively flow to the high-voltage battery 21, the direct-current power supply 24, and the alternating-current power supply 22, various power values can be used. Here, of the five voltage units 2 according to the present embodiment, transmission of electric power between the high-voltage battery 21 and both of the direct-current power supply 24 and the alternating-current power supply 22 is frequently performed.

Here, according to the present embodiment, the direct-current power supply-side coil 54 is arranged in a position that is adjacent to one side in the coil axial direction Z of the high-voltage battery-side coil 51 and the alternating-current power supply-side coil 52 is arranged in a position that is adjacent to the other side. Therefore, the high-voltage battery-side coil 51, and the direct-current power supply-side coil 54 and the alternating-current power supply-side coil 52 of which the frequency of transmission of electric power is high can be arranged in nearby positions. Transmission therebetween at high power is easily performed. Furthermore, as a result of the 12 V power storage apparatus-side coil 53 of which the power value that flows is relatively small being farthest from the high-voltage battery-side coil 51, leakage inductance is ensured. Consequently, power transmission between a plurality of coils 5 can be efficiently performed.

According to the present embodiment as well, effects similar to those according to the first embodiment are achieved.

Here, according to the present embodiment, the arrangements of the direct-current power supply-side coil 54 and the alternating-current power supply-side coil 52 in the coil axial direction Z may be interchanged. In this case as well, the above-described effects can be achieved.

Twelfth Embodiment

Figure 22:
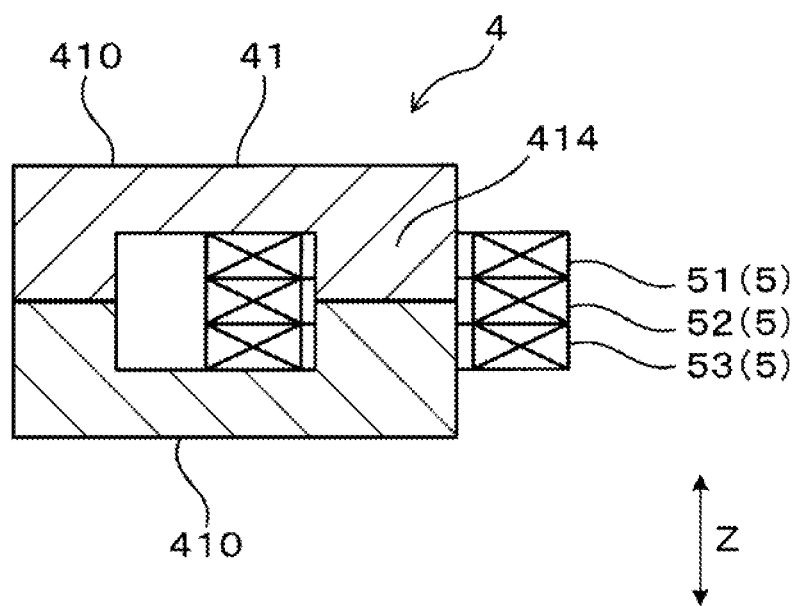
FIG. 22 is a schematic cross-sectional view of a transformer according to a twelfth embodiment.

As shown in FIG. 22, a present embodiment is an embodiment in which a shape of the core 41 is changed from that according to the first embodiment.

The core 41 is formed into a rectangular annular shape. In addition, a side 414 that configures the rectangular annular core 41 is inserted into an inner circumferential side of the plurality of coils 5. The core 41 is divided into two parts in a substantially center position in the coil axial direction Z. That is, the core 41 is configured by a combination of U-shaped of segmented cores 410 that open on sides that face each other.

Other configurations are similar to those according to the first embodiment.

According to the present embodiment as well, effects similar to those according to the first embodiment are achieved.

The present disclosure is not limited to the above-described embodiments. Various embodiments are applicable without departing from the spirit of the invention. For example, as the voltage unit, other various power supplies, loads, and the like may be used.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A power conversion apparatus that is configured to be connected to three or more voltage units, the power conversion apparatus comprising:
    three or more power-conversion circuit units that are respectively connected to the three or more voltage units; and
    a transformer that includes three or more coils that are respectively connected to the three or more power-conversion circuit units, wherein
    the three or more coils are magnetically coupled with one another and arranged so as to be arrayed in a coil axial direction,
    at least one of the voltage units is a high-voltage battery, and
    when the coil that is connected to the high-voltage battery is a high-voltage battery-side coil, of the coils other than the high-voltage battery-side coil, the coil of which a power value that flows thereto is largest is arranged in a position that is adjacent to the high-voltage battery-side coil.

2. The power conversion apparatus according to claim 1, wherein:
    the plurality of coils are arrayed in the coil axial direction on one side of the high-voltage battery-side coil, and the plurality of coils are arranged such that the coil of which the power value that flows thereto is larger is arranged on a side closer to the high-voltage battery-side coil.

3. The power conversion apparatus according to claim 2, wherein:
    at least three voltage units are the high-voltage battery, an alternating-current power supply, and a power storage apparatus; and
    an alternating-current power supply-side coil that is connected to the alternating-current power supply and a power storage apparatus-side coil that is connected to the power storage apparatus are arranged so as to be arrayed on one side of the high-voltage battery-side coil, and are arranged in order of the alternating-current power supply-side coil and the power storage apparatus-side coil from a side closer to the high-voltage battery-side coil.

4. The power conversion apparatus according to claim 1, wherein:
    the three or more voltage units are the high-voltage battery, an alternating-current power supply, and a direct-current power supply; and
    an alternating-current power supply-side coil that is connected to the alternating-current power supply and a direct-current power supply-side coil that is connected to the direct-current power supply are arranged so as to be adjacent to both sides of the high-voltage battery-side coil in the coil axial direction.

5. The power conversion apparatus according to claim 2, wherein
    the three or more voltage units comprises four or more voltage units which are the high-voltage battery, a heater, a power storage apparatus, and an alternating-current power supply; and
    a heater-side coil that is the coil that is connected to the heater and an alternating-current power supply-side coil that is the coil that is connected to the alternating-current power supply are arranged so as to be adjacent to both sides of the high-voltage battery in the coil axial direction.

* * * * *